(12) United States Patent
Bilodeau et al.

(10) Patent No.: US 6,313,840 B1
(45) Date of Patent: *Nov. 6, 2001

(54) SMOOTH SHADING OF OBJECTS ON DISPLAY DEVICES

(75) Inventors: William D. Bilodeau, Boulder Creek; Paul C. Chen, Cupertino; Matthew J. Foley, Santa Clara; Stephen N. Schiller, Hayward, all of CA (US)

(73) Assignee: Adobe Systems Incorporated, San Jose, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/844,701

(22) Filed: Apr. 18, 1997

(51) Int. Cl.[7] ..................................................... G06T 11/40
(52) U.S. Cl. ............................................. 345/423; 345/431
(58) Field of Search ..................................... 345/423, 442, 345/431

(56) References Cited

U.S. PATENT DOCUMENTS

| | | | |
|---|---|---|---|
| 4,275,413 | * 6/1981 | Sakamoto et al. | 358/80 |
| 5,063,375 | 11/1991 | Lien et al. | 340/703 |
| 5,163,126 | * 11/1992 | Einkauf et al. | 345/423 |
| 5,301,267 | * 4/1994 | Hasset et al. | 345/469 |

(List continued on next page.)

FOREIGN PATENT DOCUMENTS

| | | |
|---|---|---|
| 0 596 667 A1 | 5/1994 | (EP) . |
| 0 707 420 A1 | 4/1996 | (EP) . |
| 0 749 099 A2 | 12/1996 | (EP) . |

OTHER PUBLICATIONS

Parametric Bicubic Surfaces, XP–002112059, pp. 523–599, 736–741.
"Survey of Texture Mapping", IEEE Computer Graphics an applications, 11/86, pp. 56–67.

(List continued on next page.)

*Primary Examiner*—Raymond J. Bayerl
*Assistant Examiner*—Thomas J Joseph
(74) *Attorney, Agent, or Firm*—Fish & Richardson P.C.

(57) ABSTRACT

A method for defining a color gradient across a region in a display space that includes defining a bi-cubic patch enclosing the region. The bi-cubic patch includes four corners having a color associated therewith and four curves connecting pairs of the corners forming a closed loop. The four curves define the color gradient across the bi-cubic patch as a function of the four colors associated with the four corners of the bi-cubic patch. The method includes defining a unit square in parameter space including a mapping function from the unit square to the bi-cubic patch such that the corners of the bi-cubic patch map to the corners of the unit square. The color of every point in the unit square is a bi-cubic interpolation of the four colors associated with the four corners of the bi-cubic patch. The method includes clipping the bi-cubic patch for display of the region. In another aspect, the invention provides a method of accurately rendering color gradients across a bi-cubic patch that includes subdividing the bi-cubic patch into sub-patches until each side of a given sub-patch is a good approximation of a line and checking to determine if for all points inside of a given sub-patch the color associated with each point is sufficiently accurate. If not, the sub-patch is further subdivided until the color associated with each point inside a given sub-patch is sufficiently accurate. The method includes dividing the sub-patches into polygons and rendering the polygons.

2 Claims, 5 Drawing Sheets

U.S. PATENT DOCUMENTS

| | | | |
|---|---|---|---|
| 5,392,385 | * | 2/1995 | Evangelisti et al. .................. 345/431 |
| 5,438,654 | * | 8/1995 | Drebin ................................... 345/469 |
| 5,454,068 | * | 9/1995 | Ramanujam .......................... 345/419 |
| 5,594,853 | * | 1/1997 | Salesin et al. ........................ 345/441 |
| 5,619,626 | * | 4/1997 | Huddy ................................... 345/442 |
| 5,621,872 | * | 4/1997 | Tokumasu et al. ................... 345/442 |
| 5,848,198 | * | 12/1998 | Penn ...................................... 382/276 |
| 5,870,105 | * | 2/1999 | Jensen .................................. 345/441 |
| 5,886,703 | * | 3/1999 | Mauldin ............................... 345/423 |
| 5,995,109 | * | 11/1999 | Goel et al. ............................ 345/442 |

OTHER PUBLICATIONS

Westmore, "Real–time shaded colour polygon generation", IEE Proceedings, vol. 134, No. 1, 1/87, pp. 31–37.

Williams, "Graphics system designers strive for photorealism", Computer Design, 8/88, No. 14, pp. 50–61.

Barsky, Brian A., et al.; "An Adaptive Subdivision Method With Crack Prevention for Rendering Beta–spline Objects"; Berkeley, CA.

* cited by examiner

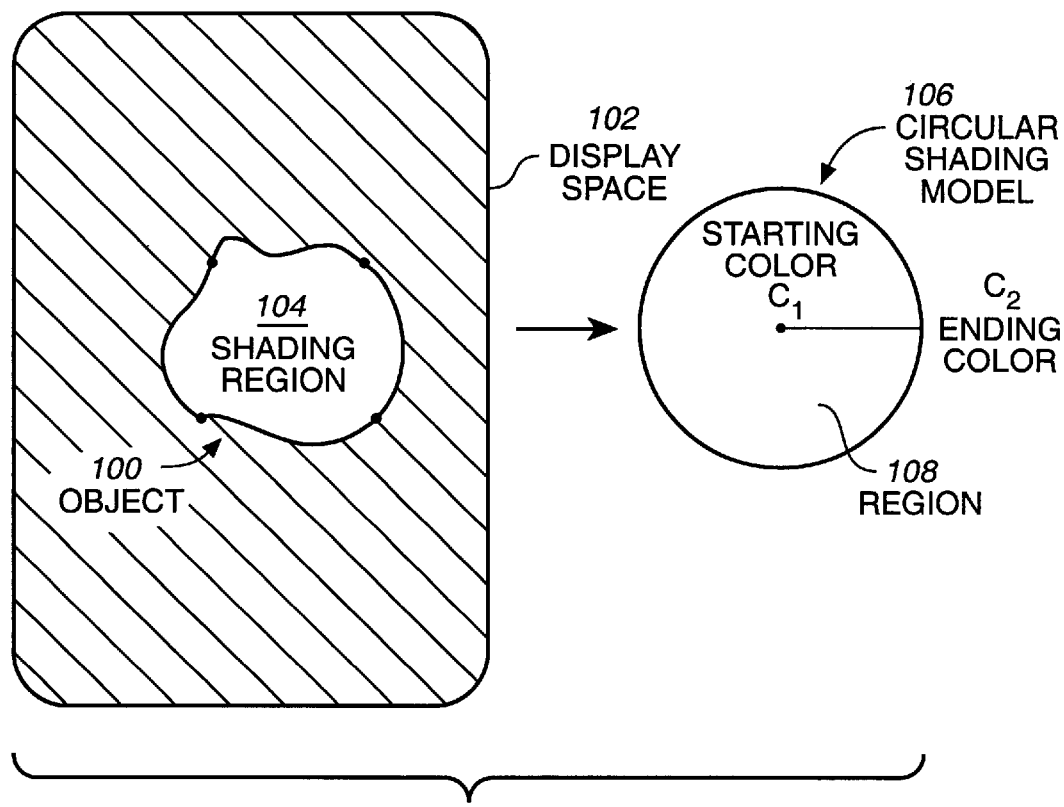
FIG._1

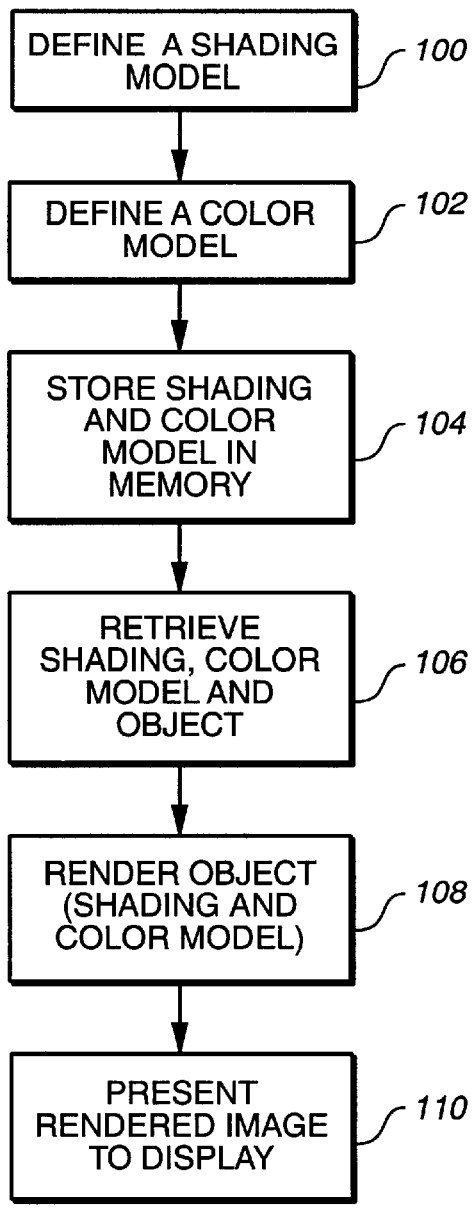
FIG._2
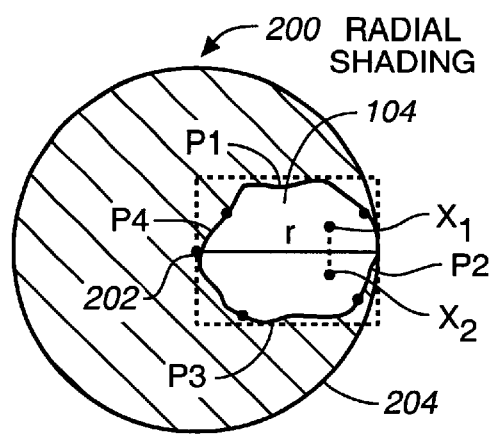
FIG._3
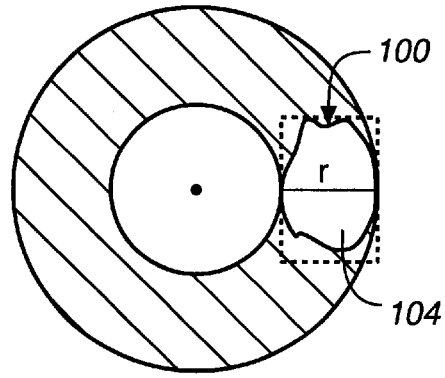
FIG._4

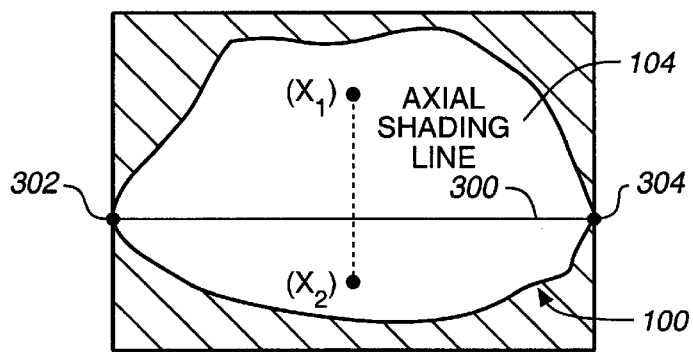
FIG._5
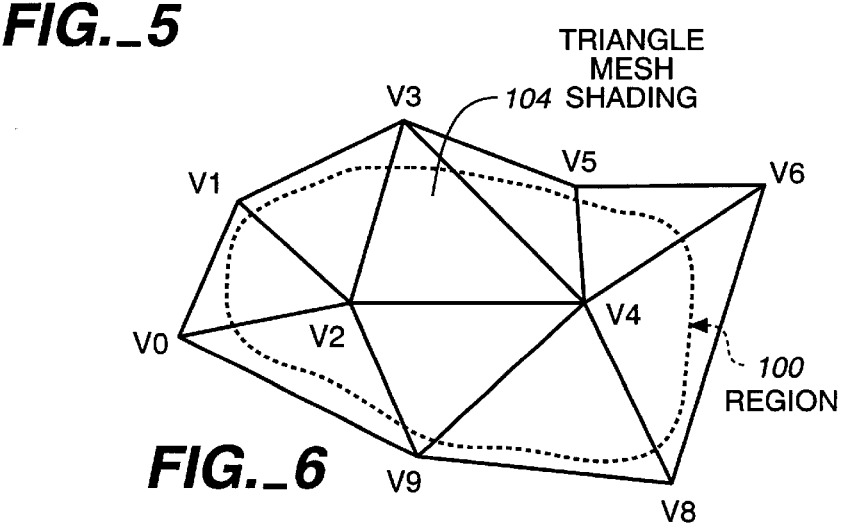
FIG._6
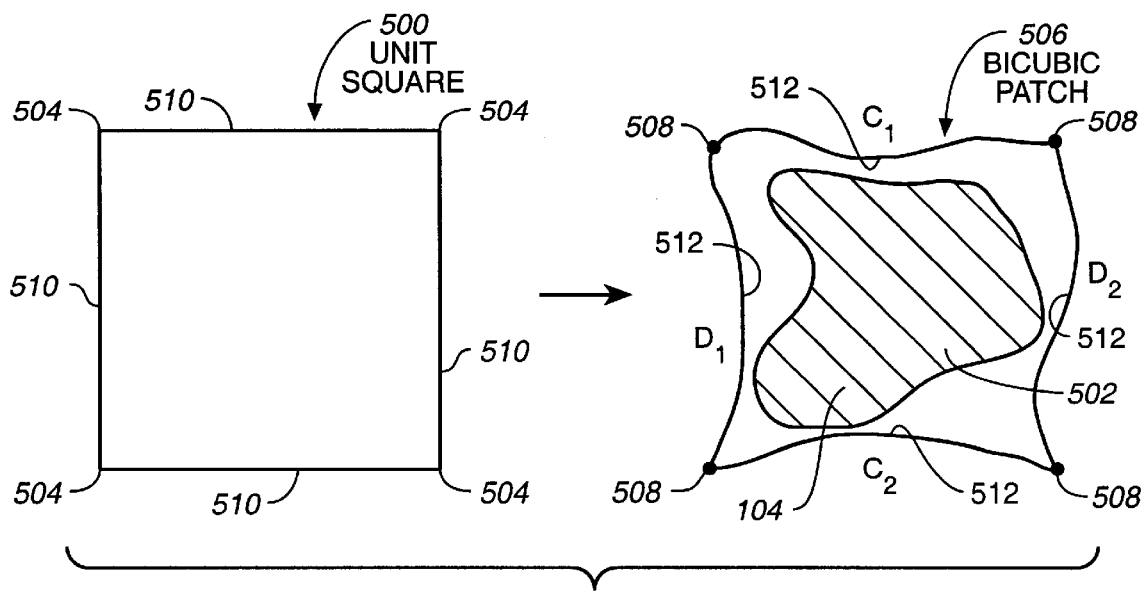
FIG._7

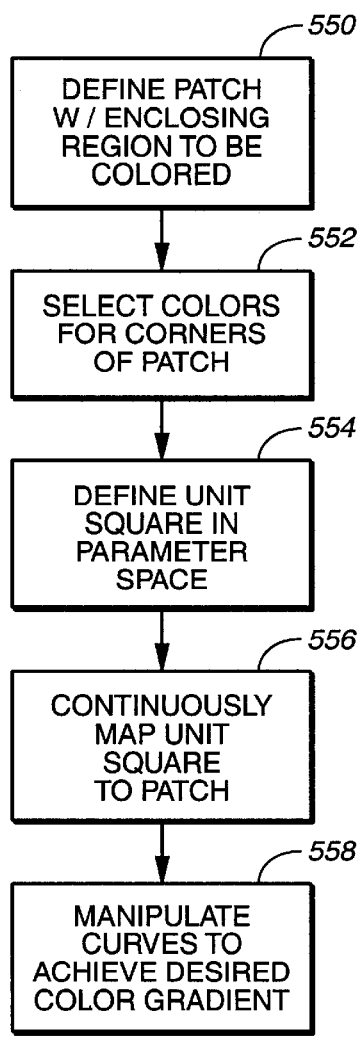
FIG._8
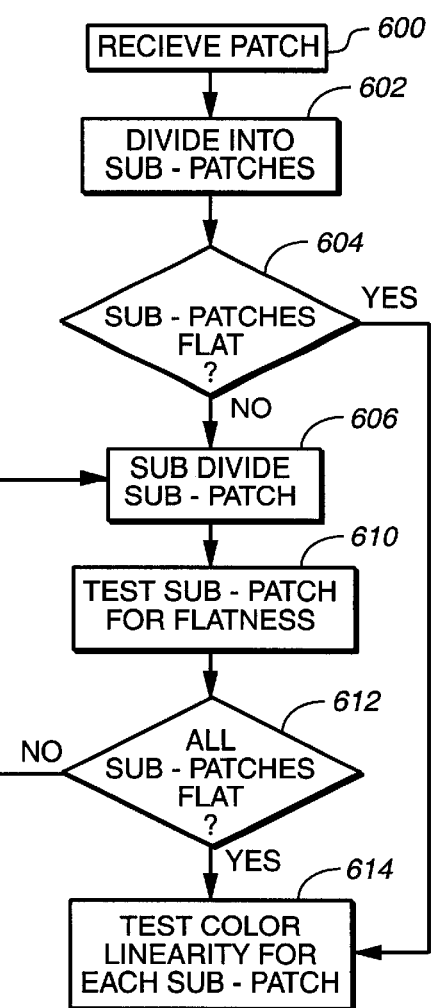
FIG._9

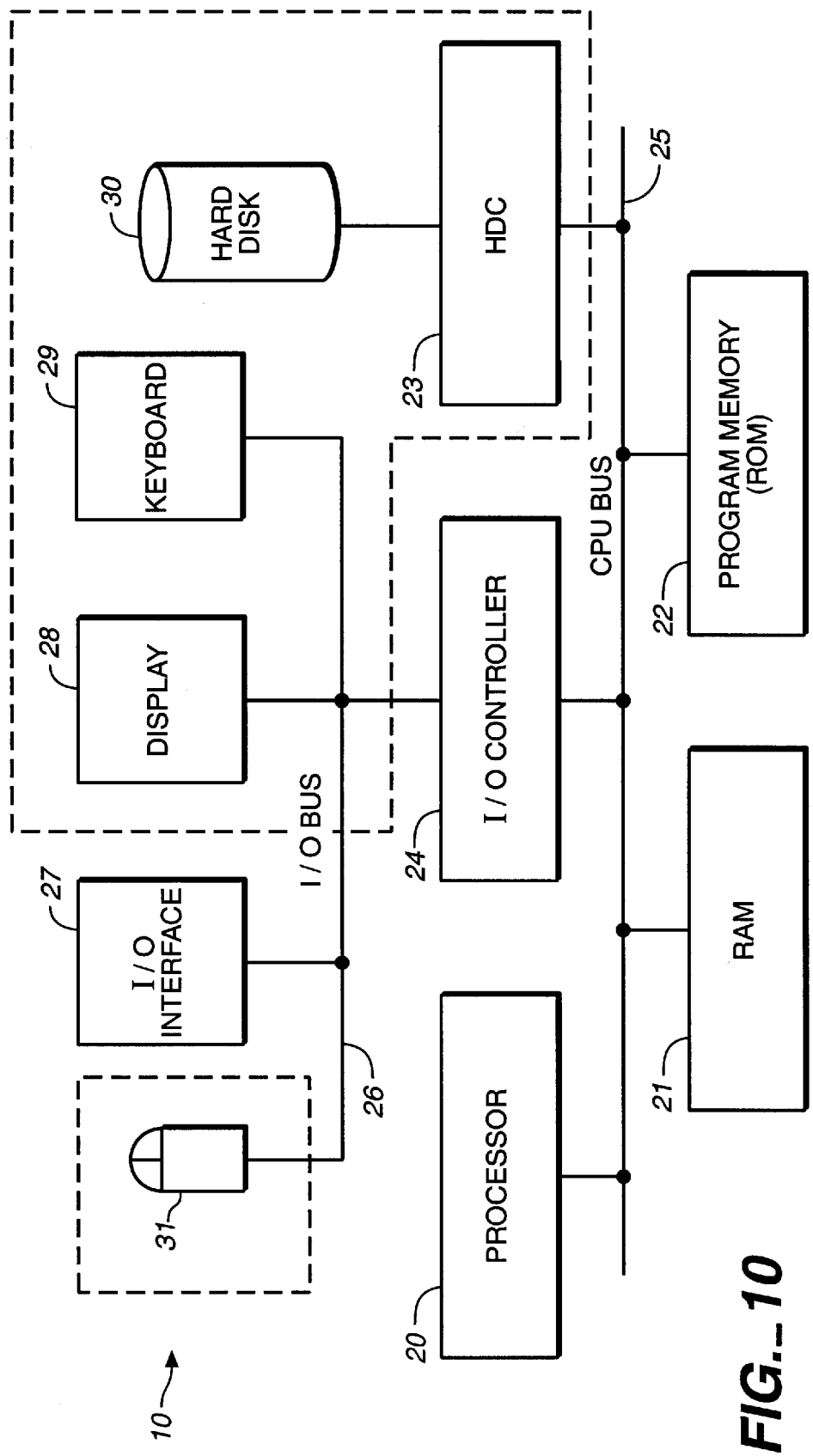
FIG._10

SMOOTH SHADING OF OBJECTS ON DISPLAY DEVICES

BACKGROUND OF THE INVENTION

The present invention relates generally to methods and systems for shading computer generated images and more particularly to methods and apparatus for shading objects for display on a display device.

In many computer systems, it is common to represent and convey information to a user through digital images. These images may take a variety of forms such as alphanumeric characters and graphs and other pictorial representations. The digital images are conveyed to a users on a raster or continuous tone display devices, such as video monitors, printers and the like. Typically, the digital images are stored in digital form, manipulated and then displayed.

Digital images are generally stored as a geometric description of a scene. The description can be manipulated by the user, then converted to digital raster image data for display. How a two or three dimensional object appears when it is displayed to a user depends on numerous factors including the types of light sources illuminating it; its properties including color, texture and reflectance; and its position and orientation with respect to the light sources, the viewer and other surfaces which may reflect light on the object.

It is often desirable to present objects for display in color. In conventional practice, color may be applied to a region by defining a single color for the entire region (a "flat" coloring), or to add realism, a plurality of colors may be employed. A transition between colors across the surface of an object is referred to as a color gradient. In order to display a realistic image, a smooth transition between colors across painted areas is required. Conventionally, gradients have been created as pre-computed digital images. This technique leaves the user with limited flexibility because the gradient has already been rendered, and modifications are limited. Alternatively, gradients were defined as contours of constant color. These types of gradient also lack flexibility because the interpolation of colors in the gradient may be bivariate, which is difficult to be represented with contours and the number of contours used in the representation is device dependent.

SUMMARY

In general, in one aspect, the invention provides a method for defining a color gradient across a region in a display space that includes defining a bi-cubic patch enclosing the region. The bi-cubic patch includes four corners having a color associated therewith and four curves connecting pairs of the corners forming a closed loop. The four curves define the color gradient across the bi-cubic patch as a function of the four colors associated with the four corners of the bi-cubic patch. The method includes defining a unit square in parameter space including a mapping function from the unit square to the bi-cubic patch such that the corners of the bi-cubic patch map to the corners of the unit square. The color of every point in the unit square is a bi-cubic interpolation of the four colors associated with the four corners of the bi-cubic patch. The method includes clipping the bi-cubic patch for display of the region.

In another aspect, the invention provides a method for approximating an existing color gradient associated with a first region in a display space for use in a second region in the display space. The method includes defining a bi-cubic patch enclosing the second region, defining a unit square in parameter space including a mapping function from the unit square to the bi-cubic patch and manipulating one or more of the curves in the bi-cubic patch until the color gradient of the second region visually approximates a color gradient of the first region.

In another aspect, the invention provides a method of accurately rendering color gradients across a bi-cubic patch that includes subdividing the bi-cubic patch into sub-patches until each side of a given sub-patch is a good approximation of a line and checking to determine if for all points inside of a given sub-patch the color associated with each point is sufficiently accurate. If not, the sub-patch is further subdivided until the color associated with each point inside a given sub-patch is sufficiently accurate. The method includes dividing the sub-patches into polygons and rendering the polygons.

Preferred embodiments include the following features. Rendering the polygons includes dividing the polygons into Gouraud triangles and rendering the Gouraud triangles. Each side of a given sub-patch is a good approximation when a lateral error between a side and its corresponding segment in display space is less than 0.5 pixels or a user-defined tolerance. The color for each point within a sub-patch is sufficiently accurate when control points associated with a sub-patch are evenly spaced.

The method further includes checking to determine if for all points inside of a given polygon the color associated with each point is sufficiently accurate and, if not, further subdividing the polygon until the color associated with each point inside a given polygon is sufficiently accurate. The color for each point within a polygon is sufficiently accurate when the color of a center point in the polygon is within a predefined tolerance of a true color for the polygon.

In another aspect, the invention provides a method of defining a color gradient across a region in a display space that includes defining a parametric bi-cubic patch covering a region to be shaded. Each patch includes four corners and four parametric cubic curves in a closed loop joining the four corners. Each corner has a corner color. The method includes the step of performing a bilinear interpolation on the corner colors to map an interpolated color to every location on the parametric bi-cubic patch.

In another aspect, the invention provides a method of interactively modifying an existing gradient to create a new gradient type that includes defining a parametric bi-cubic patch covering a region to be shaded. Each patch includes four corners and four parametric cubic curves in a closed loop joining the four corners. Each corner has a corner color. The method includes performing a bilinear interpolation on the corner colors to map an interpolated color to every location on the parametric bi-cubic patch thereby defining a gradient, manipulating one or more of the cubic curves in the bi-cubic patch to change the gradient and displaying the bi-cubic patch interactively to the user.

In another aspect, the invention provides a method of accurately rendering color gradients across a bi-cubic patch that includes subdividing the bi-cubic patch into sub-patches until each side of a sub-patch is a good approximation of a line, then subdividing further until the interpolation within the sub-patch is linear within a specified tolerance. The method includes subdividing the sub-patch into polygons and rendering the polygons.

Preferred embodiments of the invention include the following features. The polygons are rendered with Gouraud shading.

In another aspect, the invention provides a method for accurately rendering color gradients with Gouraud-shaded polygons that includes subdividing a gradient into quadrilateral regions in which a bilinear interpolation of colors associated with corners of a quadrilateral region would render the gradient substantially. The method includes subdividing each quadrilateral so that Gouraud shading provides an accurate shading result within a specified tolerance.

Preferred embodiments of the invention include the following features. A color space of the gradient is non-linear with respect to a display device's color space and subdivision of quadrilateral regions continues until a piecewise linear approximation of a device color space interpolation is accurate to within a specified tolerance.

In another aspect, the invention provides a method of rendering a non-linear color gradient using linear interpolation that includes defining a non-linear color function and subdividing the color gradient into Gouraud shaded triangles. Each triangle has a parameter associated with each vertex. The method includes using Gouraud-shading to linearly interpolate the parameter across a respective triangle. At each point on the triangle, an interpolated parameter is used to evaluate the non-linear color function which provides a color value.

The invention has numerous advantages. The concepts of three dimensional computer graphics rendering are applied to create two dimensional shaded objects. The present invention provides a smooth shading for an object in which a shading model is used to place color in a two dimensional region, while a color model is used to define the range of colors to be applied in the shading.

Once a smooth shading is defined for a particular region, a user may easily adjust the shading and create complex color gradients for the filled region.

Smooth shading has an additional benefit over conventional shading techniques because the gradients are rendered pixel by pixel on the given display device, they can include all of the colors the device is capable of reproducing, and at the highest resolution possible.

Other features and advantages of the invention will be apparent from the following description, including the drawings, and from the claims.

BRIEF DESCRIPTION OF THE DRAWING

FIG. 1 is a diagram of a display space of a raster display device for displaying digital images.

FIG. 2 is flow diagram of a method defining a smooth shading over a region according to the invention.

FIG. 3 shows a radial shading according to the invention.

FIG. 4 shows an alternative radial shading according to the invention.

FIG. 5 shows axial shading according to the invention.

FIG. 6 shows a triangle mesh shading according to the invention.

FIG. 7 is a schematic of a patch mesh according to the invention.

FIG. 8 is a flow diagram for shading a region according to the invention.

FIG. 9 is a flow diagram for a method of rendering a patch according to the invention.

FIG. 10 is a block diagram of a programmable information processing system according to the invention.

DETAILED DESCRIPTION

With reference to FIG. 1, a two-dimensional object 100 displayed in a display space 102 is shown. Object 100 defines a region 104 of arbitrary shape and size. A two-dimensional shading of region 104 is defined including a shading model and a color model. The shading model defines the geometric shading of region 104. In one embodiment, the shading model is defined to be in the shape of a circle 106 (a "radial shading") with a radius r, defining a region 108. The color model defines the color range for points within region 108. The color model associated with radial shading 106 includes starting and ending colors $c_1$ and $c_2$. The color at every point within the region 108 is defined by a combination of the shading model and the color model as an interpolation of colors $c_1$ and $c_2$ along all radii of circle 106. Once defined, only the intersection of regions 108 and 104 is displayed in a raster image for region 108. In this way, an artist (user) can fill a region whose shape is independent of the shape defined by the shading model.

With reference to FIG. 2, in a method of defining a color gradient for achieving smooth shading across a filled area, a shading model is defined (100). The shading model specifies the geometry of a color gradient. Shading models include radial, axial, function shading, triangle mesh shading and patch mesh shading.

With reference to FIG. 3, an example of a radial shading 200 for region 104 is shown. A radial shading may be in the shape of a circle, ellipse, or polygon. In addition, a radial shading may define the shading for the area between two boundary elements having the same shape where the shape may be a circle, an ellipse or a polygon. For example, a radial shading may define the shading for a disc or an annulus region. In this type of shading model, the boundary elements need not be centered on the same point. A color gradient may be defined between the center and the periphery by a color model. A color model defines the transition from the color designated for the center to the color designated for the periphery. A color model associated with a radial shading includes a color defined for a centroid 202 (in this case the center of the circle, but the centroid may be offset from the center in some applications) and the periphery 204. In a radial shading, the color for all angles Θ is a function of the proportional radius r (distance from the centroid). In the particular example of FIG. 3 where the centroid is at the center of circle 200, any two points at the same proportional distance r from the center (such as points X1 and X2) will have the same color.

A radial shading for the region 104 may also be in the shape of an annulus, i.e., the area between concentric circles (FIG. 4). In this type of radial shading, a gradient may be defined from the outside of a first circle to the inside of the second circle by a color model. A color is defined for each circle, the color model defines the transition between the two colors.

Referring now to FIG. 5, an axial shading for the region 104 is shown. A axial shading is in the shape of a line 300. The line includes a start point 302 and an end point 304. The start point and the end point each have an associated color. A color model may define the gradient between the start and the end point.

A function shading is defined almost entirely by its associated color model. A function shading merely provides a bounding box in which a two dimensional color function, defined by a color model, is rendered. Typically, the color function is a sampled function in which the sample values are interpolated to fill the bounding box defined by the shading model. An example of a function which can be used is a bivariate polynomial function, where for each point (x,y) in the bounding box the polynomial is evaluated to obtain a color value.

Referring now to FIG. 6, a triangle mesh shading is defined by a collection of triangle vertex coordinates, with a color defined at each vertex. The colors are interpolated within the triangles using Gouraud shading. In this technique, the color model defines the colors at the coordinates and the interpolation of color values, and the shading model is Gouraud shading. The effect of this type of shading model is to produce an approximation of bilinear interpolation of the color values at the vertices. This method can be used to render 3D scenes. A triangle mesh shading can also be used to interpolate parameter values which are used as inputs to functions defined by the color model. Instead of specifying colors at the vertices, the color model specifies a single parameter value at each vertex, and a color function of one parameter for the whole triangle. When the triangle is rendered, the parameter values are interpolated and passed to the color function, which returns a color value for the corresponding parameter value. The color model is used to create a two-dimensional shading for aesthetically pleasing results.

A patch mesh shading may be used to describe a non-linear color gradient over a region. A patch mesh is a collection of adjoining patches. For present purposes, a patch is defined as a two-dimensional parametric surface. For example, a tensor product surface may be mapped from a two-dimensional unit square to a three dimensional surface bounded by 4 curves. In one embodiment of the invention, smooth shading patches are defined which provide mappings from a unit square to a two-dimensional region bounded by 4 curves. A color model defines the colors at the corners of the unit square. An implicit color function bilinearly interpolates the corner colors across the unit square. Since every point in the unit square is mapped to a point in the patch, a gradient is also defined by the mapping from interpolated colors on the unit square to points within the region. As with triangle mesh shading, the colors can be replaced with parameter values, and the interpolated parameters passed to a color function which provides the actual color. Patches are described in greater detail below in reference to FIG. 7.

Referring again to FIG. 2, after a shading model is defined, then a color model is defined which includes a color range and may include a color function, unless it is implicitly defined in the shading model (102). The color function defines how a given coordinate in the shading model maps to a particular color. For example, an exponential function may be selected for the function. Alternatively, the shading model selected in step 100 may include an implicit mapping function. As described above, a patch mesh includes an implicit mapping function.

The shading model and associated color model are stored in memory (104). At the time for display, the object to be displayed and its associated shading model and color model are retrieved from memory and the object is rendered. The shading and object may be subject to coordinate space transformations. These transforms may be made prior to rendering. Typically, in a 2D rendering environment these are limited to affine transformations. Since the shading is subject to coordinate transformations, the user can define transformations to change the appearance of the gradient—scaling, skewing, rotating, and so on. Finally, the digital image including shading is presented for display on a raster scan device (110).

Gradients and Functions

As mentioned previously, gradients are created in the invention by defining a shading model and a color model. The shading model defines the geometry—where to place the colors, and how they change spatially across the region. The color model defines the range of colors to be displayed and a color function which determines color values to be used within the region. The separation between shading model and color model allows the user to mix various shading models and color models to produce new gradients from a set of pre-defined shading models and color models.

Interacting with a system through a graphical user interface, for example, a user may select from a range of pre-defined shading models and color models. The shading models include axial, radial, function shading, triangle mesh, and patch mesh, as described above. The user also selects from a set of color functions which include sampled functions, exponential interpolation, stitching functions, and bivariate polynomial functions.

Sample functions consist of a one or two-dimensional array of sample values. In building an array, the values of the samples may be chosen freely. For example, they could be generated by sampling a mathematical function at regular intervals, or even a digital representation of a natural image. All functions must provide a color value for any value within the function's domain. Domains must be continuous, therefore the sample function must interpolate color values between samples. Linear and cubic spline interpolation may be included in the function.

The exponential interpolation function takes a starting and ending value and returns a color value by interpolating between the starting and ending values. The interpolation is exponential, and the user can specify the exponent value. Multiple component color values may be interpolated on a per-component basis.

The stitching function combines an array of arbitrary functions and "stitches" them together within a shading model. The functions it can stitch together include all of the one-input functions, including itself.

The bivariate polynomial function is a way for the user to create a bivariate polynomial of degree n, where n is a constant. By specifying all of the coefficients of an n degree polynomial, the user can specify any bivariate polynomial of degree n. One can consider the bivariate polynomial function as an implicit function where continuously changing values are returned in areas outside of where the function is zero, sometimes referred to as the "gauge space" of the function.

As an example of the shading model and color model interaction, consider a radial gradient (shading) with an exponential interpolation function. The radial shading may, for example, define a shading between two circles, a small inner circle and a larger concentric outer circle. As part of the color model, starting and ending colors are provided as well as a color function. An exponential interpolation function has one input function. Here, the input values correspond to positions along the radius between the two circles. This is the domain of the color function, and we can define it to be from 0 to 1. The radial shading model will map values within the region to be shaded to distances along the radii. In this example, points on the smaller inner circle will map to zero while points on the larger outer circle will map to one. Points in between will map to values between zero and one. Thus for every point within the region, a mapping is made to the distance along the radius, scaled to values between 0 and 1. This distance is a parameter value ("t"), which is passed to the exponential interpolation function "s(t)". The function interpolates between the starting and ending colors, using t as the parameter of interpolation to return a color value for the given location. Note that the user could have just as easily replaced the exponential interpolation function with a one input sampled function in which case the parameter t would then be used as a position within the sample array, and a color would be returned based on a sample value. In this example, interpolation is used if t is between two sample values.

Patch Shading

Referring to FIG. 7, smooth shading across a filled area 502 may be accomplished with the use of a bi-cubic patch 506. Bi-cubic patches have been used in the prior art to represent three-dimensional geometry. A bi-cubic patch is a parametric surface bounded by cubic curves (C1, C2, D1, D2). Two types of bi-cubic patches may be use: a Coons patch bounded by cubic Bezier curves (hereinafter a "Coons patch"), and a bi-cubic tensor product surface ("tensor product patch"). The Coons patch can be converted easily to a tensor product surface, so all patches are effectively tensor product surfaces, even though the system may allow a Coons patch to be specified. A tensor product patch is a mapping from a unit square 500 to a patch 506 bounded by four cubic curves, with four additional curves defining the area of the patch within the boundary curves. Typically in 3-dimensional (3D) implementations the curves are 3D curves. For the creation of gradients, two-dimensional curves are used. Corners 504 of the unit square map to corners 508 of tensor product patch 506. Similarly, the four edges 510 of the unit square map to the four edges 512 of the tensor product patch 506. Also, every point within unit square 500 maps to a point on the surface (tensor product patch) 506.

The mapping may be defined by a pair of parametric functions, one for each dimension. If u and v are the parameters corresponding to the two axes of unit square 500, then a function X(u,v) maps points on unit square 500 to x coordinate values on tensor product patch 506. A second function, Y(u,v) maps each point on the unit square (u,v) to y coordinates on the tensor product patch 506. Therefore, each point on the tensor product surface is defined as (x,y)=(X(u,v), Y(u,v)). Specifically for a bi-cubic Bezier patch, which is a surface defined with a cubic Bezier curves, the functions are of the form:

$$S(u,v) \Sigma^3_{j=0} 93^3_{j=0} P_{ij} B_i(u) B_j(v)$$

where $p_{ij}$ is the control point for row i, cokumn j, of the Bezier control net, and $B_i(u)$ and $B_j(v)$ are the Bernstein polynomials for u and v:

$$B_0(t)=(1-t)^3$$

$$B_1(t)=3t(1-t)^2$$

$$B_2(t)=3t^2(1-t)$$

$$B_3(t)=t^3$$

To specify a gradient, the user defines colors at the four corners 508 of the of the patch, or equivalently, the four corners 504 of the unit square. The user then defines the control points of the surface. As mentioned previously, a mapping is defined for every point on the unit square to a point on the surface (patch). Thereafter, the corner colors are bilinearly interpolated over the unit square, which then gets mapped to a gradient in the shape of the patch. Once the four corner colors have been defined, the user can then manipulate the patch curves to get whatever gradient is desired.

The changes in color within the gradient are affected by the geometry of the patch. For example, a square patch will display a simple bilinear interpolation of the corner colors. If the left and right curves are made to curve inward at the middle, then the colors of the gradient will be squeezed in the middle and fan out at the top and bottom. Thus, changes in the curves intuitively define changes in the gradient.

The user may specify patch curves that cause a "foldover" condition. A foldover is when multiple points on the unit square map to one location in the patch. A simple painter's algorithm can be used to determine the visible parts of the surface. Foldovers can be used to create special effects that resemble 3D geometry. With appropriate choice of corner colors, a convincing result can be produced.

The patch 506 can be defined to include a given region 502. When the gradient is rendered only, the intersection of the region and the patch will be filled (by clipping to the region).

The principles of single patch gradients can be applied to patch meshes. A patch mesh is a set of patches with shared edges. Each patch in the mesh has an associated mesh of unit squares with equivalent topology. Each unit square has 4 corner colors. Shared edges share corner colors. Each unit square includes a bilinear interpolation of the four corner colors which gets mapped to the corresponding bi-cubic patch. A patch mesh allows the user to create a more complex geometry in the gradient as well as allowing more colors to be interpolated.

As with triangle meshes, the colors of the patch can be replaced with parameter values, in which case a color function needs to be specified. In this example, four parameter values are specified at the corners of the unit square. A bilinear interpolation is performed on the four parameter values to produce a single parameter for each point on the unit square, and equivalently on the patch. When the patch is rendered, the parameter value is passed to the color function which returns an actual color value.

Referring to FIG. 8, in a method for defining a color gradient across the region in a display space, a bi-cubic patch is defined enclosing the region (550). Colors are selected and associated with the four corners of the bi-cubic patch (552). Thereafter, a unit square in parameter space is defined associated with the bi-cubic patch (554). The unit square is mapped to the bi-cubic patch such that each point in the unit square maps to at least one point in the bi-cubic patch wherein the color of every point in the unit square is a bilinear interpolation of the four corner colors associated with the four corners of the bi-cubic patch. The user thereafter defines control points for the bi-cubic patch (556). In one example, the control points may be four Bezier curves which define the color gradient across the bi-cubic patch as a function of the four colors associated with the four corners. The color of the region may thereafter be selected by manipulating the control points associated with the bi-cubic patch to create the desired shading (558).

Visual Approximation

The use of bi-cubic patches to define color gradients allows for complex color gradients to be specified easily. For example, the Bezier curves associated with the Coons patches are easily manipulated to vary a color gradient over a filled area. One advantage of the use of bi-cubic patches to define color gradients is the intuitive changes in color associated with interactive manipulation of the Bezier curves. Stretching one of the boundary curves will result in stretching the gradient in the same direction. This allows users to interactively create gradients for various special effects. For example, the user can make the gradient blend four separate shapes together by making the boundary curves match the given shapes. More shapes and colors can be blended by using a patch mesh, resulting in a combination of blends in one gradient.

At times, users may want to match an existing gradient. This can be accomplished by logically dividing an existing gradient into patches and defining a corresponding patch mesh. For example, a type of gradient known as a "conical" gradient is a circular or elliptical shaped gradient where the interpolation follows the circumference of the circle. A visually equivalent conical gradient can be produced by specifying four Coons patches in a mesh.

Each patch in the mesh is one quarter of the circle. Each patch uses one of its curves for the circumference of the circle, and two of its curves for radii of the circle. The fourth curve is degenerate, i.e. it is zero length, and represents the center of the circle. Thus, each patch in the mesh is shaped like a slice of a pie. The corner colors are defined so that the corners on the circumference are equal to the interpolated colors along the circumference. The corners at the center are set to the same colors as the corresponding circumference corners. Visually, the gradient looks the same as a conical gradient. Allowing this type of gradient matching makes for a smaller interface. Instead of trying to define every possible gradient in the interface, the system provides the user tools to create an infinite variety of gradients.

Rendering

Rendering is the process of creating images from the stored digital information (shading model and color model which may take the form of a bi-cubic patch). Rendering of gradients made up of one or more patches is a two step process. The first step is to subdivide the gradient into sub-patches. The second step is to divide the sub-patches into polygons and then render the polygons. In the case of sub-patches, an adaptive subdivision technique is used.

Adaptive subdivision works by recursively dividing a patch into smaller and smaller sub-patches until the patch curves are sufficiently flat that the sub-patches can be approximated as polygons. While flatness is an adequate criterion for terminating subdivision when generating 3D geometry, it is not sufficient for generating smoothly shaded gradients.

Consider the case of a Coons patch shaped like a square. The beginning and ending control points of each curve are coincident with corners of the square. A non-linear interpolation can be defined by moving the two control points of the left and right curves which are not corner control points to the bottom of the curves. The curves are still straight lines, but the interpolation is not linear. If the implementation used only flatness as a test for stopping subdivision, then it would stop without any subdividing because the sides of the patch are already flat. This would cause a square polygon to be rendered with Gouraud shading, producing a linear interpolation, which was not intended.

Accordingly, the system includes a linearity check to make sure the sub-patch is not only geometrically flat, but also linear in its interpolation. After a curve in a sub-patch is determined to be flat, a test for linearity is performed. For example, the linearity test may look at the distances between control points of the patch and the colors at the endpoints of the Bezier curve (corner colors of the patch or sub-patch). The colors at the two control points between the endpoints of a respective curve are computed and compared to the colors that would have occurred at equal thirds along the path using a linear interpolation. If the colors values are within a specified tolerance, the patch is then assumed to be linear within the tolerance, and subdivision of patches can stop.

For the purposes of this discussion, this tolerance is called the "smoothness". Smoothness plays an important role in specifying how accurate the colors in a gradient are. The smoothness criterion allows the user to fine tune the rendering performance, with a speed versus quality trade-off, similar to the flatness tolerance for geometry.

In general, smoothness is the tolerance for color accuracy. It may be defined as a real number from 0 to 1, where 0 represents an allowable error of 0% and 1 represents an allowable error of 100%. As an example, a display device may be able to represent 256 levels of each color component red, green, and blue. If the smoothness value is 0.01, then each color component is allowed to be no more than 2 color levels greater or lesser than the exact value.

Smoothness not only applies to patch subdivision. It is also used for subdivision of polygons used by other types of shadings. For example, function shading when used with a sampled function is implemented by creating a mesh of quadrilaterals, where associated with each corner of the quadrilaterals is a sample color value. By dividing the quadrilaterals into triangles and rendering them with Gouraud shading, an approximation of bilinear interpolation can be done. What is desired however, is exact bilinear interpolation. Accordingly, further subdivision of the quadrilaterals is done until the approximation is within the smoothness tolerance. In this example, a test for smoothness is made by checking to determine for all points inside of a given polygon whether the color associated with each point is sufficiently accurate. If not, further subdividing of the quadrilateral is performed. In one embodiment, the color for each point within a quadrilateral is determined to be sufficiently accurate when the color of a center point in a quadrilateral is within a predefined tolerance of a true color for the quadrilateral.

Another use of the smoothness tolerance is to prevent inaccuracies in color conversion. Colors in a color model specification are given in a particular color space. Color spaces are sets of color components that can be combined to create any color in the color space's gamut. For example, red, green, blue (RGB) is a color space, so is the set of colors cyan, magenta, yellow, and black (CMYK). In addition to these device dependent color spaces there are device independent color spaces such as CIE L*a*b* in which colors are specified according to an international standard rather than percentages of phosphor intensity (RGB) or ink (CMYK) which are inherently device dependent. If a color model for a shading is specified in a color space different than the device, the conversion is often non-linear. To accurately represent an interpolation when the conversion is non-linear, the interpolation can be done in the specified color space, and then converted to the destination color space. This however, is costly on devices such as high resolution printers because the number of pixels to convert is very large.

To avoid this performance cost, the system, when rendering quadrilaterals, interpolates in the device's color space by converting just the corner colors. To maintain accuracy, the quadrilaterals are subdivided enough so that a piecewise linear interpolation approximates the non-linear conversion within a given tolerance. In one embodiment, this tolerance is the smoothness tolerance. When subdividing, a sampling of the exact interpolation (with conversion) at various points is performed to see if a linear approximation is within tolerance. If so, subdivision can stop. The smoothness tolerance is used as an upper bound on all color approximations allowing the user to have control over quality versus performance with a simple, easy to understand interface.

Further subdivision of patches and sub-patches may be required after the linear approximation test is satisfied in the initial color space to assure a linear approximation after conversion to a device color space. One type of shading model described above is a Gouraud-shaded triangle mesh shading. In this type of shading model, if the color space of the specified colors is linear with respect to the display device's color space (i.e., the conversion from the specified color to the device's representation is linear), then the triangles can be rendered as-is with Gouraud shading techniques. If the color space conversion is not linear, then the triangles are subdivided further so that linear approximation of the non-linear conversion can be accomplished.

Referring to FIG. 9, in a simple method for rendering a bi-cubic patch, a rendering engine receives a patch to be rendered (600). The patch is divided into sub-patches (602). The sub-patches are checked to determine if their flatness (each side being a good approximation of a line) is within a predefined tolerance (604). The flatness test is a geometric constraint which requires that the sub-patch must be within a predefined flatness tolerance when mapped back to a unit square. Typically, the tolerance used is one half pixel. Alternatively the user may set the tolerance level.

If the flatness test fails for a sub-patch, then the sub-patch is subdivided (606). The flatness test is repeated for each sub-patch (610). If the flatness test is satisfied for all the sub-patches (612) then the process continues at step 614. Otherwise, any non-flat sub-patches are subdivided again at step 606. In one embodiment, a depth first recursive process is used to further subdivide the sub-patches.

After all of the sub-patches have passed the flatness test, a check is made to determine whether or not the each sub-patch is linearly accurate (614). The linearity is checked by determining the distances between control points and the colors at the endpoints of the Bezier curves associated with the patch (corner colors of the sub-patch). Colors at the two control points between the endpoints of the curve are computed and compared to those color values that would have occurred at equal thirds along the path using linear interpolation. If the colors values are within a specified tolerance, the patch is then assumed to be linear within a tolerance, and subdivision can stop.

If the linearity for any sub-patch is not sufficiently accurate (616), then each of these "poor color linearity" sub-patches is subdivided again (618). Thereafter the linearity for each new sub-patch is checked (620). When the linearity for all sub-patches is sufficiently accurate, then the sub-patches are divided into polygons (622). Thereafter a linearity check may be performed on the polygons by checking to assure the color for all points in the polygon is a good approximation of a true color as described above. Finally, the polygons are divided into Gouraud shaded triangles and are rendered (623). Thereafter, the process ends (624).

The invention may be implemented in hardware, firmware or software, or a combination of the three. Preferably the invention is implemented in a computer program executed on a programmable computer having a processor, a data storage system, volatile and non-volatile memory and/or storage elements, at least one input device and at least one output device. The programmable computer may be part of a printer which receives shading model and color model information and executes the methods disclosed herein to produce smoothly shaded regions on a visual or hard copy display connected to (or at) the output device.

By way of example, FIG. 10 shows a block diagram of a programmable information processing system (computer) 10. Computer 10 preferably includes a processor 20, random access memory (RAM) 21, a program memory 22 (preferably a writable read-only memory (ROM) such as a flash ROM) and an input/output (I/O) controller 24 coupled by a CPU bus 25. Computer 10 may optionally include a hard drive controller 23 which is coupled to a hard disk 30 and CPU bus 25. Hard disk 30 may be used for storing application programs, such as the present invention, and data. Alternatively, application programs may be stored in RAM or ROM.

I/O controller 24 is coupled by means of an I/O bus 26 to an I/O interface 27. I/O interface 27 receives and transmits data in analog or digital form over communication links such as a serial link, local area network, wireless link, and parallel link. Optionally, a display 28, a keyboard 29 and a pointing device (mouse) 31 may also be connected to I/O bus 26. Alternatively, separate connections (separate buses) may be used for I/O interface 27, display 28, keyboard 29 and pointing device 30. Programmable processing system 10 may be preprogrammed or it may be programmed (and reprogrammed) by downloading a program from another source (e.g., a floppy disk, CD-ROM, or another computer).

Each computer program is tangibly stored in a machine-readable storage media or device (e.g., program memory 22 or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

The present invention has been described in terms of specific embodiments, which are illustrative of the invention and not to be construed as limiting. Other embodiments are within the scope of the following claims.

What is claimed is:

1. A method of accurately rendering color gradients across a bi-cubic patch comprising the steps of:

subdividing the bi-cubic patch into sub-patches until each side of a given sub-patch is a good approximation of a line;

checking to determine if, for all points inside of a given sub-patch, the color associated with each point is sufficiently accurate and, if not, further subdividing the sub-patch until the color associated with each point inside a given sub-patch is sufficiently accurate wherein the color for each point within a sub-patch is sufficiently accurate when control points associated with a sub-patch are evenly spaced;

dividing, the sub-patches into polygons; and rendering the polygons.

2. A method of accurately rendering color gradients across a bi-cubic patch comprising the steps of:

subdividing the bi-cubic patch into sub-patches until each side of a given sub-patch is a good approximation of a line;

checking to determine if, for all points inside of a given sub-patch, the color associated with each point is sufficiently accurate and, if not, further subdividing the sub-patch until the color associated with each point inside a given sub-patch is sufficiently accurate;

dividing the sub-patches into polygons;

checking to determine if for all points inside of a given polygon the color associated with each point is sufficiently accurate and, if not, further subdividing the polygon until the color associated with each point inside a given polygon is sufficiently accurate wherein the color for each point within a polygon is sufficiently accurate when the color of a center point in the polygon is within a predefined tolerance of a true color for the polygon; and rendering the polygons.

* * * * *